United States Patent
Cebry et al.

(10) Patent No.: US 7,453,303 B2
(45) Date of Patent: Nov. 18, 2008

(54) CONTROL CIRCUIT FOR LOSSLESS SWITCHING CONVERTER

(75) Inventors: George L. Cebry, Glendale, AZ (US); Ernest Graetz, Largo, FL (US); Robert E. Johnson, Clearwater, FL (US); Robert E. Tomlinson, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 100 days.

(21) Appl. No.: 11/323,627

(22) Filed: Dec. 30, 2005

(65) Prior Publication Data

US 2007/0153553 A1    Jul. 5, 2007

(51) Int. Cl.
*H03K 3/00* (2006.01)

(52) U.S. Cl. .................................... 327/291; 363/21.11

(58) Field of Classification Search .................. 323/272, 323/276, 222, 224, 282, 286; 363/16–20, 363/131, 97, 40, 49, 21.11, 21.01; 327/291
See application file for complete search history.

(56) References Cited

U.S. PATENT DOCUMENTS 5,764,495 A * 6/1998 Faulk ....................... 363/21.13

6,388,896 B1   5/2002 Cuk

* cited by examiner

*Primary Examiner*—Rajnikant B Patel
(74) *Attorney, Agent, or Firm*—Ingrassia, Fisher & Lorenz, P.C.

(57) ABSTRACT

A DC-to-DC converter comprises a converter section and a controller section. The converter section comprises a primary section and a secondary section. The primary and secondary section includes MOSFET switches. The controller section is coupled to the converter section and comprises a pulse width modulation (PWM) section and a delay section. The PWM section comprises an error amplifier configured to generate an error signal representative of a variance between an output voltage of the converter section and a reference voltage and a PWM configured to produce a PWM signal based on the error signal. The delay section comprises of delay circuits configured to generate delayed output signals from the PWM signal and power switching device drivers coupled to the delay circuits and configured to receive the delay output signals and generate a controlled signals to control the on/off state of the MOSFET switches.

19 Claims, 2 Drawing Sheets

CONTROL CIRCUIT FOR LOSSLESS SWITCHING CONVERTER

FIELD OF THE INVENTION

The present invention generally relates to a control circuit, and more particularly to a control circuit for a DC-to-DC power converter having lossless switching.

BACKGROUND OF THE INVENTION

DC-to-DC converters change DC electrical power from one voltage level to another. Typically, a DC-to-DC converter converts a supply voltage level of DC power to an output voltage level. For example, 1.5 volts DC from a battery can be stepped up to a higher voltage to operate electronic circuitry. DC-to-DC converters also may be used to provide ground isolation, power bus regulation, etc.

There are various types of DC-to-DC converters including buck converters, boost converters, and buck-boost converters. The buck converters and the boost converters step the input voltage down and up, respectively, and a buck-boost converter can either step the input voltage up or down.

Typically, DC-to-DC converters rely on the switching between a first stage where energy is being received from a source and a second stage where energy is delivered to a load. The switching can be done using transistors such as MOSFETs or IGBETs as high frequency switches. One drawback to the use of transistor switching in high switching frequency applications is that the switching of the transistor switches from an on to an off state can result in the production of noise as manifested by high-frequency energy that can be transmitted by electromagnetic induction to other nearby equipment, causing interference and power loss. This problem has lead to the development of lossless, soft switching. One version of a converter having high efficiency and lossless switching is described in U.S. Pat. No. 6,388,896. The converter disclosed in U.S. Pat. No. 6,388,896 includes a lossless DC-to-DC converter, thus enabling a high switching frequency with reduction of converter size and weight. While a converter with lossless switching is described in the U.S. Pat. No. 6,388,896, there is not disclosure of an appropriate control circuit to control the switching of the converter.

Accordingly, it is desirable to provide a control circuit for a DC-to-DC power converter having lossless or near lossless, soft switching. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A controller for a DC-to-DC converter with lossless switching comprises a pulse width modulation (PWM) section and a delay section. The PWM section includes an error amplifier configured to generate an error signal that is representative of the variance between an output voltage and a desired output voltage and a PWM configured to receive the error signal and compare the error signal to a reference to produce a PWM signal. The delay section includes a delay circuit configured to receive the PWM signal and delay the output of the PWM signal and MOSFETs drivers configured to receive the delayed PWM signal and produce signals to control the on-off state of MOSFET switches in the converter section.

In another embodiment, a DC-to-DC converter comprises a converter section and a controller section. The converter section comprises a primary section and a secondary section. The primary section comprises MOSFET switches, an inductor, a capacitor, and a primary transformer. The secondary section comprises MOSFET switches, an inductor, capacitors, and a secondary transformer. The controller section is coupled to the converter section. The controller section comprises a pulse width modulation (PWM) section and a delay section. The pulse width modulation section comprises an error amplifier configured to generate an error signal representative of a variance between an output voltage and a reference voltage, and a PWM configured to produce a PWM signal based on the error signal. The delay section comprises a delay circuit configured to generate a delay output signal from the PWM signal and MOSFET drivers coupled to the delay circuit and configured to receive the delayed output signal and generate a control signals to control on/off state of the MOSFET switches.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
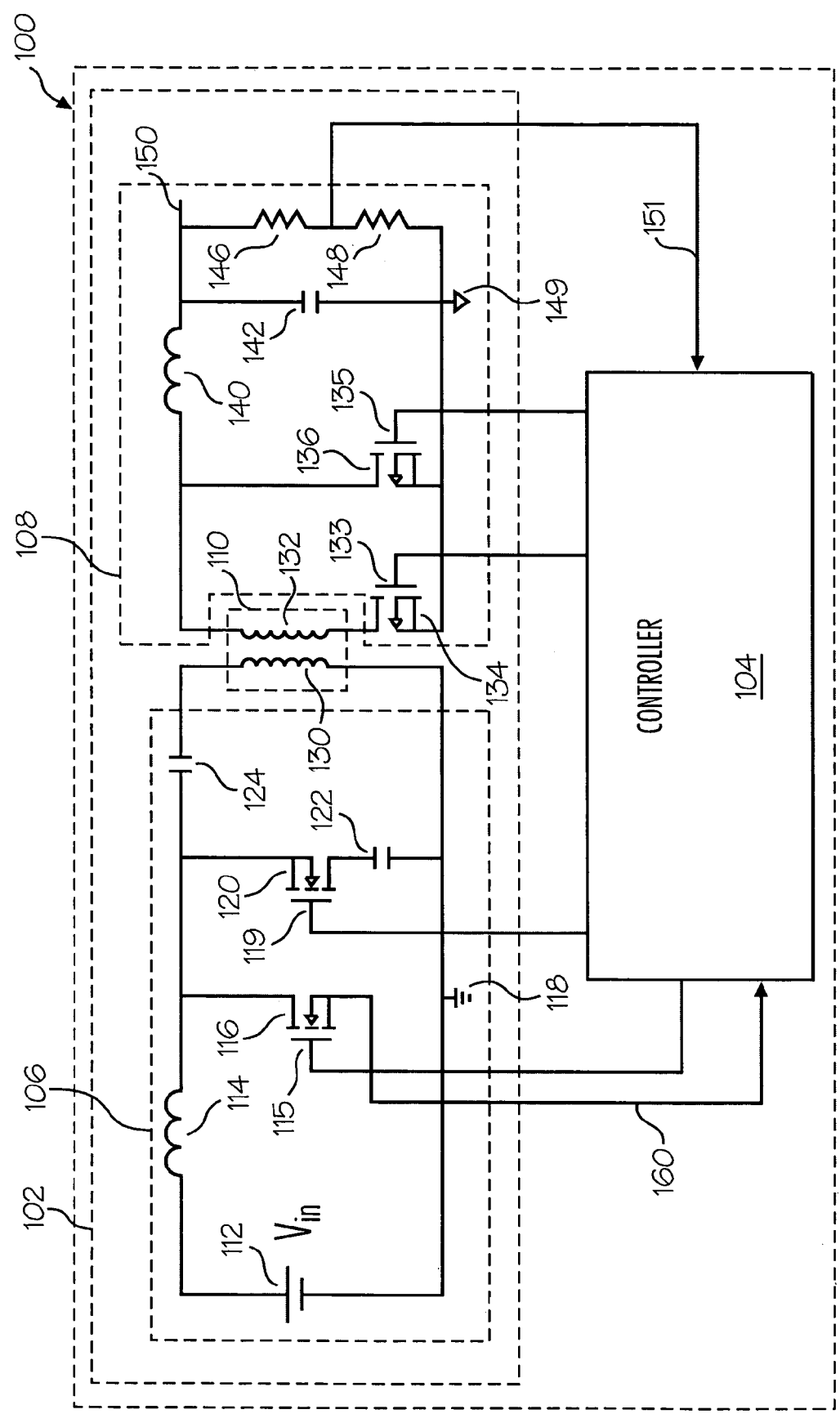
FIG. 1 is a partial schematic of a DC-to-DC power converter in accordance with an exemplary embodiment of the present invention.

FIG. 1 illustrates a DC-to-DC power converter 100 that receives a DC voltage at an input voltage and produces a single converted DC voltage at the output. The DC-to-DC power converter 100 includes a converter section 102 and a controller section 104. The converter section 102 comprises a primary side 106 and a secondary side 108 coupled by, in one exemplary embodiment, an isolation transformer 110. While FIG. 1 illustrates an isolated power converter 100, a non-isolated exemplary embodiment of the present invention can be produced by replacing the isolation transformer with an inductor, a resonance inductor and an output switch located between the resonance inductor and an output inductor. FIG. 1 only shows a single converted output voltage but the controller can also be applied to a multiple output converter where a single output or the sum of two outputs are regulated by the controller and the other outputs are cross-regulated via a common coupled transformer 110 and inductor 140.

The primary side of the converter section 102 comprises an input terminal 112 coupled to an input inductor 114. An input MOSFET switch 116 has a drain coupled to the input inductor 114 and a source connected to a current sense input 160 on controller 104 The current sense input 160 can also be between the drain of MOSFET 116 and between input inductor 114 and input capacitor 124. In this case the source of MOSFET 116 would be connected to first ground reference 118. A complementary input MOSFET switch 120 has a source coupled to the input inductor 114 and a drain connected to an auxiliary capacitor 122. An input capacitor 124 is coupled between the input inductor 114 and primary side windings 130 of the isolation transformer 110.

The secondary side 108 of the converter section 102 comprises a complementary output MOSFET switch 134 having a drain connected to secondary side windings 132 of the isolation transformer 110. An output inductor 140 is coupled between the secondary side windings 132 of the isolation transformer 110 and the output terminal 150. An output MOSFET switch 136 includes a drain connected to the secondary side windings 132 of the isolation transformer 110 and a source connected to an output common reference 149. An output capacitor 142 is coupled between the output terminal 150 and an output common reference 149. Resistors 146 and 148 are coupled in series between the output terminal 150 and an output common reference 149. The connection between resistor 146 and resistor 148 is connected to terminal 151 and coupled to controller 104.

In operation, an input voltage, $V_{IN}$, is applied to input terminal 112. When input MOSFET switch 116 and output MOSFET 136 are turned on and complementary input MOSFET switch 120 and complementary output MOSFET switch 134 are turned off, current flows through the input MOSFET switch 116 from the input terminal 112 through input inductor 114 and from the series combination of input capacitor 124 and the primary side windings 130 of isolation transformer 110. Current also flows through the output MOSFET switch 136 and output inductor 140 to the load connected on terminal 150. When input MOSFET switch 116 and output MOSFET switch 136 are turned off, the voltage across the input inductor 114 reverses to maintain current flow. This current then flows through complementary input MOSFET switch 120 and the series combination of input capacitor 124 and the primary side windings 130 of isolation transformer 110. During this time, energy is transferred from the primary side windings 130 to the secondary side windings 132 of isolation transformer 110 to the output terminal 150, with the output inductor 140 and output capacitor 142 acting as a smoothing filter. When complementary input MOSFET switch 120 and complementary output MOSFET switch 134 turn off, input MOSFET switch 116 and output MOSFET 136 are turned on again, the cycle repeats.

The cycling between the "on" and "off" states of the MOSFET switches is known as the duty cycle. The duty cycle can be expressed as $D=t_{on}/(t_{on}+t_{off})$. The on-time ($t_{on}$) is the time that the converter is taking energy from the source. The off-time ($t_{off}$) is the time that the energy transfer inductor is idle or delivering energy to the load. The period is the sum of the on-time and the off-time. The output voltage at terminal 150 in FIG. 1 is define as $V_{in}*D*$(Secondary Turns/Primary Turns).

The controller section 104 produces and sends signals that operate the MOSFET switches in order to control the output voltage. The controller section 104 is coupled to a control gate 115 of input MOSFET switch 116, a control gate 119 of complementary input MOSFET switch 120, a control gate 135 of output MOSFET switch 136, a control gate 133 of complementary output MOSFET switch 134 and current sense input 160 of input MOSFET 116 source. Controller section 104 further receives the output voltage from output terminal 151 and input current from terminal 160 and, based on the output voltage and the desired output voltage, controls the on-off state of the MOSFET switches.

While the exemplary embodiment of FIG. 1 illustrates the use of MOSFET switches, specifically n-channel enhancement mode MOSFET switches, other p-channel and depletion mode MOSFET switches may also be used. Further, any power switching device capable of operating in a power supply as shown in FIG. 1 such as bipolar junction transistors (BJTs), insulated gate bipolar transistors (IGBTs), junction fields effect transistors (JFETs), MOSFETs, any combination thereof and the like. In one exemplary embodiment, either the output MOSFET switch 136, the complementary output MOSFET switch 134, or both can be replaced by diodes.

Figure 2:
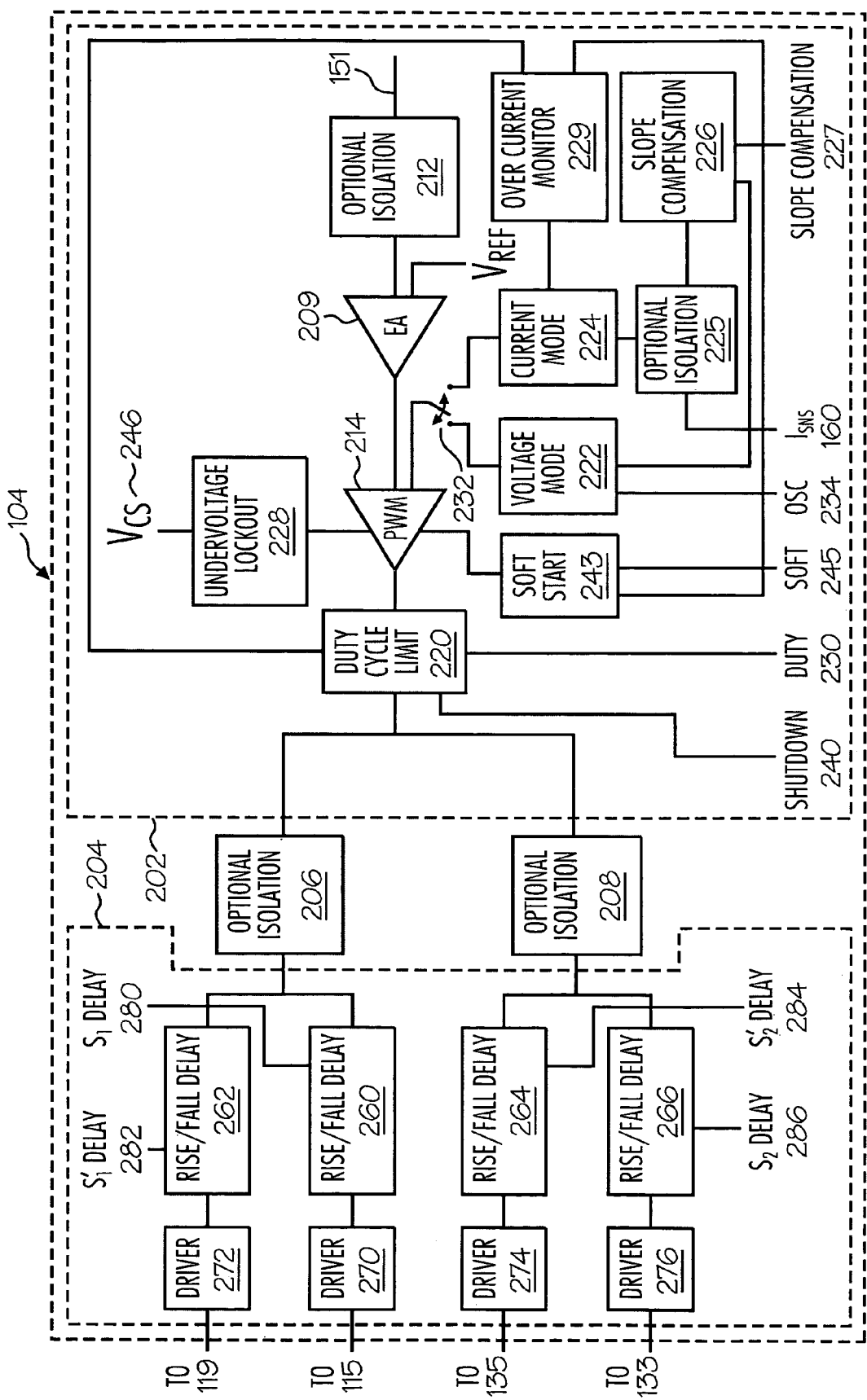
FIG. 2 is a partial schematic of a controller for the DC-to-DC power converter of FIG. 1 in accordance with an exemplary embodiment of the present invention.

FIG. 2 illustrates an exemplary controller section 104 of the DC-to-DC power converter 100. The controller section 104 comprises a pulse width modulation section 202 and a switch delay section 204. In one exemplary embodiment, pulse width modulation section 202 and switch delay section 204 are isolated by a first isolation circuit 206 and a second isolation circuit 208. This optional isolation can be used if primary to secondary isolation is needed or when driving high side switches like complementary input MOSFET switch. In certain embodiment, additional isolation may be required when the gate of the switch is at a very high voltage. This isolation is known in the art and not pictured in FIG. 2. In the exemplary embodiment of FIG. 2, isolation can be done using magnetic isolation, although other methods of isolation, such as optical isolation can be used.

Pulse width modulation section 202 generates a pulse width modulated signal to switch the various switches in the converter section 102 to maintain a constant output voltage. Pulse width modulation section 202 includes a first error amplifier 209 coupled to an output voltage 151 and a pulse width modulator (PWM) comparator 214. In one exemplary embodiment, an optional third isolation circuit 212 can be provided between the output terminal 151 and the first error amplifier 209. The optional third isolation circuit 212 is configured to isolate the controller section 104 from the secondary side 108 of the converter section 102.

In operation, and assuming that the optional third isolation circuit 212 is not present, first error amplifier 209 receives a voltage from output terminal 151. The voltage from the output terminal 151 is compared against a reference voltage, $V_{REF}$ that is set at the desired output voltage level. A signal, is generated at the output of the first error amplifier 209 that is dependent on the amount the voltage from the output terminal varies from the reference voltage. The PWM comparator 214 receives the output of the first error amplifier 209 and compares it to a voltage wave form, such as, in one exemplary embodiment, a saw-tooth waveform. The output of the PWM comparator 214 is either high (a logical "1") or low (a logical "0") depending on the result of the comparison. If the input voltage to the PWM falls below the reference voltage, the output of the PWM comparator 214 results in an increased duty cycle that increases the output voltage. If the input voltage to the PWM falls below the reference voltage, the output of the PWM comparator 214 results in a reduced duty cycle and reduces the output voltage back to the desired voltage level.

Pulse width modulation section 202 also includes a duty cycle limiter 220, a selectable voltage control mode 222 or a current control mode 224, a slope compensator 226, an undervoltage lockout 228 and an over current monitor 229. The duty cycle limiter 220 limits the maximum duty cycle for the switching power supply. The maximum duty cycle can be set using the duty cycle input 230. Limiting the maximum duty cycle, ensures components in the converter are not overstressed during turn-on, undervoltage, and transient conditions.

The use of voltage control or current control can be selected by use of a control switch 232. When utilizing either current control or voltage control, the converter section 102 is controlled to correct for changes in the output voltage. For voltage control mode 222, an oscillator input 234 is provided to set the switching frequency of the converter and to provided a reference voltage waveform to PWM 214 and for current control mode 224 a current sense input 160, coupled from input MOSFET 116, is provided.

The undervoltage lockout controller 228 operates during start ups of the converter. The undervoltage lockout controller 228 prevents powering up the converter section 102 until a minimum voltage is supplied by a secondary voltage 246.

The slope compensator 226 is provided for current control mode 224 to compensate for instability that can occur when the duty cycle is too high. Slope compensator 226 can be coupled to current control mode 224 via isolation 225. In a typical embodiment, slope compensator 226 receives an input from the voltage control mode 222 to assist in generation of the slope compensation. The amount of slope compensation can be set at a slope compensator input 227.

The pulse width modulation section 202 also includes a shutdown control 240, and a soft start circuit 243. Shutdown control 240 is an on-off switch that turns the controller section 104 on or off. The soft start circuit 243 limits the ramp rate of the duty cycle from low value to the desired value when the power converter 100 is started. The time it takes the converter output voltage to go from zero voltage to the desired regulated voltage can be set using a soft start input 245.

The over current monitor 229 helps to protect the power converter 100 in case of a short when operating in voltage control mode. The over current monitor 229 couples to both the soft start circuit 243 and shutdown control 240 such that on detection of an over current the controller section 104 can be turned off and the soft start circuit 243 reset.

Switch delay section 204 includes, in one exemplary embodiment, a total of four power switching device drivers 270-276, a first delay 260, a second delay 262, a third delay 264 and a fourth delay 266. Each delay 260-266 is coupled between the output of the duty cycle limit 220 and the power switching device drivers 270-276. Each power switching device driver 270-276 is associated with a control gate of the MOSFET switch and controls the "on" and "off" state of the MOSFET switch. For example, in one embodiment, a first power switching device driver 270 is coupled to the control gate 115 of input MOSFET switch 116, a second power switching device driver 272 is coupled to the control gate 119 of the complementary input MOSFET switch 120, a third power switching device driver 274 is coupled to the control gate 135 of the output MOSFET switch 136 and, a fourth power switching device driver 276 is coupled to the control gate 133 of the complementary output MOSFET switch 134.

Each delay circuit 260-266 receives the same signal from the Duty Cycle Limit 220. After receiving a signal from the Duty Cycle Limit 220, which, as discussed previously can be a high (a "1") signal or a low (a "0") signal, the delays 260-266 can delay the rise and fall times coming from the PWM to the power switching device drivers 270-276 for an set amount of time. In one embodiment, delays 260-266 can delay the rise of an output signal from a low level to a high level, the fall of an output signal from a high level to a low level and invert an input. By delaying the output from the PWM comparator 214 in different ways, and by different amounts of time, each of the MOSFET switches can turn on and off at different times. By determining when each MOSFET switch of the present invention should open and close to provide best results, the delays 260-266 can be set to provide the proper delays. In one exemplary embodiment, the first delay 260 can be adjusted by a first delay input 280, the second delay 262 can be adjusted by a second delay input 282, the third delay 264 can be adjusted by a third input 284 and the fourth delay input 266 can be adjusted by a fourth input 286. The delay inputs 280-286 can receive information based on feedback received from the converter section 102 to maintain lossless switching. Although only one delay input is shown for each delay block 260-266, more inputs can be added depending on how many rise/fall time delays are required per block.

In one exemplary embodiment, all or part of the functionality in FIG. 2 can be combined in a single integrated circuit such as an application specific integrate circuit (ASIC), a field programmable gate array (FPGA), or similar structures. Providing the control functionality on a single integrated circuit allows for a power supply to be designed with a one-chip controller solution. In this embodiment, data from the delay inputs 280-286 can automatically adjust the delays 260-266 to maintain the lossless switching performance of the power supply 100. In an alternative embodiment, the drivers 270-276 can be excluded as part of the integrated circuit and provided as part of the overall converter 102.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims. Furthermore, there are various ways the functions of the controller can be produced including but not limited to electronic or passive components that are plated through hole parts, surface mount parts, gate arrays, custom integrated circuits, etc. or a combination of these parts types.

The invention claimed is:

1. A controller for a DC-to-DC converter having lossless switching comprising:
   a pulse width modulation (PWM) section comprising:
      an error amplifier configured to generate an error signal that is representative of a variance between an output voltage and a desired output voltage; and
      a fixed frequency PWM configured to receive the error signal and compare the error signal to a reference to produce a PWM signal; and
   a delay section comprising:
      a delay circuit configured to receive the PWM signal and to output a delayed PWM signal;
         wherein the pulse width modulation section and the delay circuit are formed on a single integrated circuit, and
      at least two power switching device drivers coupled to the delay circuit and configured to receive the delayed PWM signal and to produce a control signal to control the on-off state of a lossless power switching device of the DC-to-DC converter.

2. The controller of claim 1 wherein the power switching device is a MOSFET switch.

3. The controller of claim 1 wherein the PWM section is isolated from the delay section.

4. The controller of claim 3 wherein the isolation is chosen from the group consisting of magnetic isolation and optical isolation.

5. The controller of claim 1 wherein the controller comprises a selector to select a current mode of operation or a voltage mode of operation.

6. The controller of claim 5 wherein the controller receives a current sense input when using the current mode of operation.

7. The controller of claim 1 wherein each of the delay circuits includes an adjustment for varying the amount of rise and fall time delay relative to the PWM signal.

8. The controller of claim 1 wherein the PWM section further comprises a soft start circuit for limiting a duty cycle of the MOSFET switch upon startup.

9. The controller of claim 1 further comprising a duty rate limiter for limiting the duty rate of the power switching device.

10. A DC-to-DC converter comprising:
a lossless converter section comprising a primary section and a secondary section, the primary section comprising a power switching device; and
a controller implementing as a single integrated circuit and coupled to the converter section, the controller comprising:
    a pulse width modulation (PWM) section comprising:
        an error amplifier configured to generate an error signal representative of a variance between an output voltage of the converter section and a reference voltage;
        a fixed frequency PWM configured to produce a PWM signal based on the error signal; and
    a delay section comprising:
        a delay circuit configured to generate a delay output signal from the PWM signal; and
        at least two power switching device drivers coupled to the delay circuit and configured to receive the delay output signal and generate a control signal to control an on/off state of the power switching device switch.

11. The DC-to-DC converter of claim 10 wherein the power switching device is a MOSFET switch.

12. The DC-to-DC converter of claim 10 wherein the PWM section is isolated from the delay section.

13. The DC-to-DC converter of claim 12 wherein the PWM section is isolated from the delay section using magnetic isolation.

14. The DC-to-DC converter of claim 12 wherein the PWM section is isolated from the delay section using optical isolation.

15. The DC-to-DC converter of claim 10 wherein the controller comprises a selector to select a current mode of operation or a voltage mode of operation.

16. The DC-to-DC converter of claim 15 wherein the controller includes a current sense input coupled to a MOSFET switch for use in the current mode of operation.

17. The DC-to-DC converter of claim 14 wherein each of the delay circuits includes an adjustment for varying the amount of rise and fall time delay relative to the PWM signal.

18. The DC-to-DC converter of claim 11 wherein the PWM section further comprises a soft start section for limiting a duty cycle of the MOSFET switch and a duty rate limiter for limiting the duty rate of the MOSFET switch.

19. The DC-to-DC converter of claim 9 wherein the primary side of the converter section comprises at least one MOSFET switch and the secondary side of the converter comprises at least one diode, and wherein the controller section comprises one FET driver for each MOSFET switch, the FET driver configured to send a signal to switch an on-off state the at least one MOSFET switch to provide for lossless switching.

* * * * *